(12) United States Patent
Izumi (10) Patent No.: US 9,260,104 B2
(45) Date of Patent: Feb. 16, 2016

(54) VEHICLE CONTROL DEVICE AND VEHICLE CONTROL METHOD

(75) Inventor: Junta Izumi, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 13/806,365

(22) PCT Filed: Jun. 23, 2010

(86) PCT No.: PCT/JP2010/060648
§ 371 (c)(1),
(2), (4) Date: Dec. 21, 2012

(87) PCT Pub. No.: WO2011/161781
PCT Pub. Date: Dec. 29, 2011

(65) Prior Publication Data
US 2013/0096763 A1    Apr. 18, 2013

(51) Int. Cl.
*B60L 9/00* (2006.01)
*B60L 11/00* (2006.01)
(Continued)

(52) U.S. Cl.
CPC ............... *B60W 20/00* (2013.01); *B60K 6/445* (2013.01); *B60L 11/182* (2013.01); *B60R 16/03* (2013.01); *B60W 10/06* (2013.01); *B60W 10/08* (2013.01); *B60W 10/26* (2013.01); *B60W 20/106* (2013.01); *B60W 20/40* (2013.01); *B60W 50/0205* (2013.01); *B60W 2050/0089* (2013.01); *B60W 2050/0215* (2013.01); *B60W 2510/244* (2013.01); *B60W 2510/246* (2013.01); *B60W2550/12* (2013.01); *Y02T 10/6239* (2013.01); *Y02T 10/6286* (2013.01); *Y10S 903/93* (2013.01)

(58) Field of Classification Search
CPC .... B60L 11/1862; B60L 1/1872; G06F 11/00
USPC ...................... 307/10.7; 701/29, 22; 180/65.3; 320/134; 318/139
See application file for complete search history.

(56) References Cited

U.S. PATENT DOCUMENTS

2001/0040060 A1* 11/2001 Morimoto et al. ........... 180/65.3
2004/0070353 A1*  4/2004 Kayukawa et al. ........... 318/139
(Continued)

FOREIGN PATENT DOCUMENTS

| EP | 2177389 A1 | 4/2010 |
| JP | 2004-325235 A | 11/2004 |

(Continued)

OTHER PUBLICATIONS

English Translation of JP2006-149181.*

*Primary Examiner* — Helal A Algahaim
*Assistant Examiner* — Mahmoud Ismail
(74) *Attorney, Agent, or Firm* — Kenyon & Kenyon LLP (57) ABSTRACT

An ECU executes a program including the steps of determining a first value as a detection error when such specific conditions that a most recent IG OFF time period is equal to or longer than a predetermined time period, that motor running has continued since start of running, that a time period of running is equal to or shorter than a predetermined time period, that a square value of a current during running is equal to or smaller than a predetermined value, that a temperature at the time of start of running is within a predetermined range, and that a temperature of an atmosphere is within a predetermined range are satisfied, determining a second value as a detection error when the specific conditions are not satisfied, estimating SOC by using the determined detection error, and controlling drive based on the estimated SOC.

12 Claims, 8 Drawing Sheets

(51) Int. Cl.
  G05D 1/00 (2006.01)
  G05D 3/00 (2006.01)
  G06F 7/00 (2006.01)
  G06F 17/00 (2006.01)
  B60W 20/00 (2006.01)
  B60R 16/03 (2006.01)
  B60W 10/06 (2006.01)
  B60W 10/08 (2006.01)
  B60K 6/445 (2007.10)
  B60W 50/02 (2012.01)
  B60W 10/26 (2006.01)
  B60L 11/18 (2006.01)
  G01M 17/00 (2006.01)
  G06F 19/00 (2011.01)
  H02P 1/00 (2006.01)
  B60W 50/00 (2006.01)

(56) References Cited

U.S. PATENT DOCUMENTS

| | | |
|---|---|---|
| 2008/0036421 A1 | 2/2008 | Seo et al. |
| 2008/0288132 A1* | 11/2008 | King et al. ............... 701/22 |
| 2010/0052618 A1* | 3/2010 | Inoue et al. ............. 320/134 |
| 2010/0082198 A1* | 4/2010 | Arai et al. ................ 701/29 |
| 2010/0102630 A1* | 4/2010 | Turski et al. ............ 307/10.7 |
| 2010/0114413 A1 | 5/2010 | Ichikawa et al. |

FOREIGN PATENT DOCUMENTS

| | | |
|---|---|---|
| JP | 2005-331482 A | 12/2005 |
| JP | 2006-170943 A | 6/2006 |
| JP | 2006149181 A * | 6/2006 |
| WO | 2008/117732 A1 | 10/2008 |

* cited by examiner

VEHICLE CONTROL DEVICE AND VEHICLE CONTROL METHOD

This is a 371 national phase application of PCT/JP2010/060648 filed 23 Jun. 2010, the contents of which are incorporated herein by reference.

TECHNICAL FIELD

The present invention relates to control of a vehicle incorporating a rotating electric machine and a power storage device, and particularly to a technique for estimating a detection error dependent on a temperature environment for a sensor used for estimating a state of charge of a power storage device based on history of use of a vehicle.

BACKGROUND ART

In recent years, a hybrid car, a fuel cell car, an electric car, and the like which run with driving force from a motor have attracted attention as one of measures for addressing environmental issues. Such a vehicle is equipped with a power storage device, and a state of charge of a power storage device should accurately be estimated in order to sufficiently exhibit performance of the power storage device.

In view of such issues, for example, Japanese Patent Laying-Open No. 2005-331482 discloses a state of charge operation device for accurately finding a state of charge while continuing operation of a state of charge with minimum necessary accuracy even though data cannot normally be obtained, to thereby suppress influence on a control system to the minimum. This state of charge operation device includes first operation means for operating a first state of charge based on a sum value of charging and discharging currents of a power storage device, second operation means for operating a second state of charge based on an open-circuit voltage estimated from internal impedance of the power storage device, third operation means for operating a state of charge of the power storage device by weighting and combining the first state of charge and the second state of charge by using a weight set in accordance with a state of use of the power storage device, first abnormal condition processing means for stopping operation by the second operation means and fixing a weight value such that the combined value in the third operation means is set to the first state of charge when voltage data of the power storage device cannot normally be obtained, second abnormal condition processing means for stopping operation by the first operation means and fixing a weight value such that the combined value in the third operation means is set to the second state of charge when current data of the power storage device cannot normally be obtained, and third abnormal condition processing means for estimating, when temperature data of the power storage device cannot normally be obtained, a temperature from the calculated internal impedance based on a voltage of the power storage device and the charging and discharging currents and adopting this estimated temperature as an operation parameter in the first operation means and the second operation means.

According to the state of charge operation device disclosed in the literature described above, a state of charge can accurately be found by making use of both advantages of a state of charge based on a sum of currents and a state of charge based on an open-circuit voltage, and in addition, even though an abnormal condition occurs in any system for measuring a voltage, a current, and a temperature and data cannot normally be obtained, operation of a state of charge can be continued with minimum necessary accuracy and influence on a control system can be suppressed to the minimum.

CITATION LIST

Patent Literature

PTL 1: Japanese Patent Laying-Open No. 2005-331482

SUMMARY OF INVENTION

Technical Problem

A detection error of a sensor used for estimating a state of charge of a power storage device (for example, a voltage sensor, a current sensor, or a temperature sensor), however, varies depending on a temperature environment for the sensor during use. Therefore, a state of charge should be estimated, with a detection error being estimated large enough for the state of charge of the power storage device not to be lower than a lower limit value. Thus, a range of use of a state of charge of a power storage device is disadvantageously restricted. In the state of charge operation device disclosed in the literature described above, such a problem is not at all considered and it cannot be solved.

An object of the present invention is to provide a vehicle control device and a vehicle control method for achieving an expanded range of use of a state of charge of a power storage device by specifying a temperature of a sensor used for estimating a state of charge of a power storage device.

Solution to Problem

A vehicle control device according to one aspect of this invention is a vehicle control device mounted on a vehicle including a rotating electric machine serving as a drive source, a power storage device for supplying electric power to the rotating electric machine, and a sensor used for estimating a state of charge of the power storage device. This vehicle control device includes a detection unit for detecting history of use of the vehicle for specifying a temperature of the sensor and a control unit for determining a first value as a detection error of the sensor corresponding to a predetermined range when the history of use detected by the detection unit satisfies a specific condition for specifying that a temperature of the sensor is within the predetermined range, determining a second value greater than the first value as the detection error when the history of use does not satisfy the specific condition, and estimating a state of charge of the power storage device by using a result of detection by the sensor and any one determined detection error of the first value and the second value.

Preferably, the vehicle further includes an internal combustion engine as a drive source. The control unit updates a threshold value of the state of charge of the power storage device for actuating the internal combustion engine based on the determined detection error when the vehicle runs with the rotating electric machine while the internal combustion engine is stopped.

Further preferably, the sensor includes at least any one of a voltage sensor for detecting a voltage of the power storage device, a current sensor for detecting a current of the power storage device, and a temperature sensor for detecting a temperature of the power storage device.

Further preferably, the history of use includes a state of selection of the drive source. The specific condition includes such a condition that the state of selection of the drive source is a state that the vehicle has continued running with the rotating electric machine since start of running while the internal combustion engine is stopped.

Further preferably, the history of use includes a time period of running of the vehicle. The specific condition includes such a condition that the time period of running of the vehicle with the rotating electric machine while the internal combustion engine is stopped is equal to or shorter than a predetermined time period.

Further preferably, the power storage device includes a first power supply and a second power supply. The control unit updates a threshold value at which an electric power supply source is switched from the first power supply to the second power supply based on the determined detection error, while the vehicle runs with the first power supply serving as the electric power supply source for the rotating electric machine.

Further preferably, the history of use includes a square value of a current of the power storage device. The specific condition includes such a condition that the square value of the current of the power storage device is equal to or smaller than a predetermined value.

Further preferably, the history of use includes a time period during which the vehicle is left before most recent system start-up of the vehicle. The specific condition includes such a condition that the time period of being left is equal to or longer than a predetermined time period.

Further preferably, the history of use includes a temperature of the power storage device. The specific condition includes such a condition that the temperature of the power storage device at a time point of start of running of the vehicle is within a predetermined range.

Further preferably, the history of use includes a temperature of an atmosphere around the power storage device. The specific condition includes such a condition that the temperature of the atmosphere around the power storage device is within a predetermined range.

Further preferably, the vehicle further includes an internal combustion engine as a drive source. The history of use includes a state of selection of the drive source, a time period of running of the vehicle, a square value of a current of the power storage device, a time period during which the vehicle is left before most recent system start-up of the vehicle, a temperature of the power storage device, and a temperature of an atmosphere around the power storage device. The specific condition includes such a condition that the state of selection of the drive source is a state that the vehicle has continued running with the rotating electric machine since start of running while the internal combustion engine is stopped, such a condition that the time period of running of the vehicle with the rotating electric machine while the internal combustion engine is stopped is equal to or shorter than a predetermined time period, such a condition that the square value of the current of the power storage device is equal to or smaller than a predetermined value, such a condition that the time period of being left is equal to or longer than a predetermined time period, such a condition that the temperature of the power storage device at a time point of start of running of the vehicle is within a predetermined range, and such a condition that the temperature of the atmosphere around the power storage device is within a predetermined range.

A vehicle control method according to another aspect of this invention is a vehicle control method for a vehicle including a rotating electric machine serving as a drive source, a power storage device for supplying electric power to the rotating electric machine, and a sensor used for estimating a state of charge of the power storage device. The method includes the steps of detecting history of use of the vehicle for specifying a temperature of the sensor, and determining a first value as a detection error of the sensor corresponding to a predetermined range when the history of use satisfies a specific condition for specifying that a temperature of the sensor is within the predetermined range, determining a second value greater than the first value as the detection error when the history of use does not satisfy the specific condition, and estimating a state of charge of the power storage device by using a result of detection by the sensor and any one determined detection error of the first value and the second value.

Advantageous Effects of Invention

According to this invention, when the history of use of the vehicle satisfies a specific condition for specifying that a temperature range is within a predetermined range, a first value is determined as a detection error for an SOC estimation sensor corresponding to the predetermined range, and the determined detection error and a result of detection by the SOC estimation sensor are used to estimate SOC of a power storage device. Since accuracy in SOC estimation is thus improved, a range of use of SOC can be expanded. Thus, a time period of running during which running using a rotating electric machine of a vehicle is carried out can be increased. Alternatively, even in the case where a sensor is affected by heat generated in charging during rapid charging or the like using an external power supply, a greater amount of electric power can be stored. In addition, when a specific condition is not satisfied, a second value greater than the first value is determined as a detection error corresponding to a temperature range different from the predetermined range, and the determined detection error and a result of detection by the SOC estimation sensor are used to estimate SOC of the power storage device. Thus, SOC of the power storage device can be controlled so as to ensure that SOC does not exceed a lower limit or an upper limit thereof. Consequently, accelerated deterioration of the power storage device can be suppressed.

Therefore, a vehicle control device and a vehicle control method for achieving an expanded range of use of a state of charge of a power storage device by specifying a temperature of a sensor used for estimation of a state of charge of the power storage device can be provided.

DESCRIPTION OF EMBODIMENTS

An embodiment of the present invention will be described hereinafter with reference to the drawings. In the description below, the same elements have the same reference characters allotted. Their label and function are also identical. Therefore, detailed description thereof will not be repeated.

Figure 1:
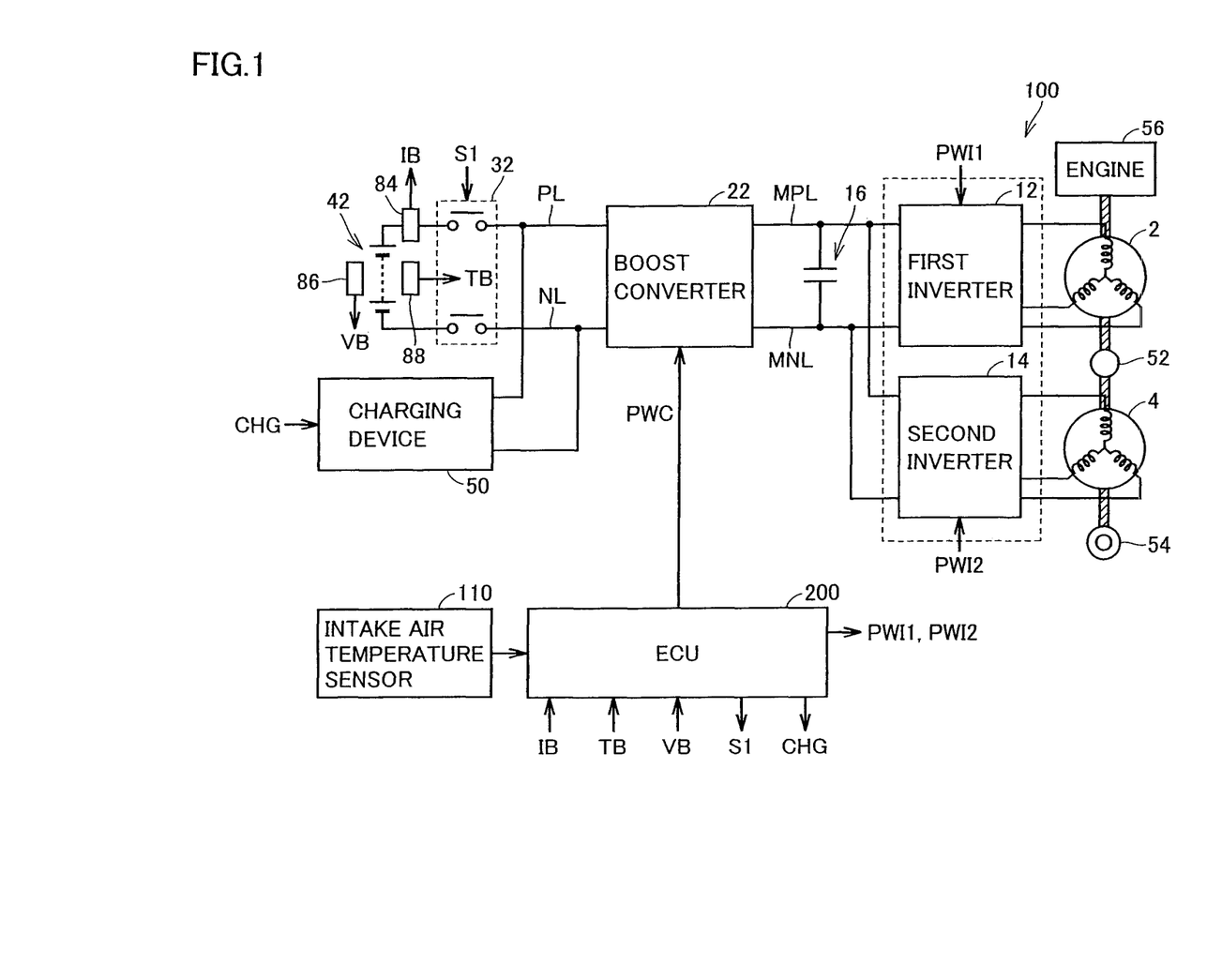
FIG. 1 is an overall block diagram of a hybrid vehicle incorporating a vehicle control device according to the present embodiment.

As shown in FIG. 1, a vehicle 100 includes a first motor generator (hereinafter denoted as MG) 2, a second MG 4, a first inverter 12, a second inverter 14, a smoothing capacitor 16, a boost converter 22, a system main relay (hereinafter denoted as SMR) 32, a main battery 42, a charging device 50, a power split device 52, a drive wheel 54, an engine 56, and an ECU (Electronic Control Unit) 200.

Though a hybrid vehicle is described as vehicle 100 in the present embodiment, vehicle 100 is not particularly limited to a hybrid vehicle and any vehicle at least having a rotating electric machine as a drive source should only be employed. Therefore, vehicle 100 may be an electric car.

First MG 2, second MG 4, and engine 56 are coupled to power split device 52. This vehicle 100 runs with driving force from at least one drive source of engine 56 and second MG 4. Motive power generated by engine 56 is split into two paths by power split device 52. One is a path for transmission to drive wheel 54 and another is a path for transmission to first MG 2.

Each of first MG 2 and second MG 4 is an AC rotating electric machine, and for example, it is a three-phase AC rotating electric machine provided with a rotor having a permanent magnet embedded. First MG 2 generates electric power by using motive power from engine 56, which is split by power split device 52. For example, when SOC (State of Charge) indicating a state of charge of main battery 42 is lower than a predetermined value, engine 56 starts and first MG 2 generates electric power, so that generated electric power is supplied to main battery 42.

Second MG 4 generates driving force by using electric power supplied from second inverter 14. Driving force from second MG 4 is transmitted to drive wheel 54. It is noted that, during braking or the like of vehicle 100, drive wheel 54 drives second MG 4, which operates as a power generator. Thus, second MG 4 operates as a regenerative brake for converting braking energy to electric power. Electric power generated by second MG 4 is supplied to the second inverter. Electric power supplied to the second inverter is supplied to main battery 42 through boost converter 22.

Power split device 52 is a planetary gear including a sun gear, a pinion gear, a carrier, and a ring gear (none of which is shown). The pinion gear is engaged with the sun gear and the ring gear. The carrier rotatably supports the pinion gear and it is coupled to a crankshaft of engine 56. The sun gear is coupled to a rotation shaft of first MG 2. The ring gear is coupled to a rotation shaft of second MG 4.

Each of first inverter 12 and second inverter 14 is connected to a main positive bus MPL and a main negative bus MNL in parallel to each other. First inverter 12 converts DC power supplied from boost converter 22 to AC power and outputs AC power to first MG 2. Second inverter 14 converts a DC current supplied from boost converter 22 to AC power and outputs AC power to second MG 4.

In addition, first inverter 12 converts AC power generated by first MG 2 to DC power and outputs DC power to boost converter 22. Second inverter 14 converts AC power generated by second MG 4 to DC power and outputs DC power to boost converter 22.

It is noted that each of first inverter 12 and second inverter 14 is implemented, for example, by a bridge circuit including switching elements of three phases. First inverter 12 drives first MG 2 by performing a switching operation in response to a control signal PWI1 from ECU 200. Second inverter 14 drives second MG 4 by performing a switching operation in response to a control signal PWI2 from ECU 200.

An intake air temperature sensor 110 is connected to ECU 200. Intake air temperature sensor 110 detects an intake air temperature in the case where air in a vehicle compartment is taken in as a cooling fan for generating cooling wind to be supplied to main battery 42 is actuated. Intake air temperature sensor 110 transmits a signal indicating a detected temperature of intake air to ECU 200.

It is noted that intake air temperature sensor 110 is provided, for example, in a cooling wind passage upstream of main battery 42. For example, intake air temperature sensor 110 may be provided in a vehicle compartment and may detect a temperature of air in the vehicle compartment.

ECU 200 calculates vehicle request power Ps based on a detection signal from not-shown each sensor (for example, a signal indicating an amount of pressing of a brake pedal, an accelerator pedal, or the like), a state of running, and the like, and calculates a torque target value and a rotation number target value of first MG 2 and second MG 4 based on calculated vehicle request power Ps. ECU 200 controls first inverter 12 and second inverter 14 such that generated torque and the number of rotations of first MG 2 and second MG 4 attain to respective target values, Main battery 42 is a rechargeable DC power supply, and it is, for example, a secondary battery such as a nickel metal hydride battery or a lithium ion battery, or a capacitor of a large capacity, or the like. Main battery 42 is connected to boost converter 22 with SMR 32 being interposed.

Though a case where main battery 42 is mounted on vehicle 100 as a main power supply is described in the present embodiment, the embodiment is not particularly limited to such a configuration. For example, in addition to main battery 42, one sub battery or two or more sub batteries may be mounted.

SMR 32 switches from any one to the other of a conduction state in which main battery 42 and boost converter 22 are electrically connected to each other and a disconnected state in which main battery 42 and boost converter 22 are electrically disconnected from each other, based on a control signal Si from ECU 200.

Boost converter 22 is connected to main positive bus MPL and main negative bus MNL. Boost converter 22 converts a voltage between main battery 42 and main positive bus MPL, main negative bus MNL, based on a control signal PWC1 from ECU 200.

Smoothing capacitor 16 is connected between main positive bus MPL and main negative bus MNL, and it reduces an electric power fluctuation component included in main positive bus MPL and main negative bus MNL.

A current sensor 84, a voltage sensor 86, and a temperature sensor 88 are further connected to ECU 200.

Current sensor 84 detects a current IB from main battery 42 to boost converter 22 and transmits a signal indicating detected current IB to ECU 200. Voltage sensor 86 detects a voltage VB of main battery 42 and transmits a signal indicating detected voltage VB to ECU 200. Temperature sensor 88 detects a temperature TB of main battery 42 and transmits a signal indicating detected temperature TB to ECU 200.

ECU 200 calculates SOC of main battery 42 based on current IB detected by current sensor 84 and voltage VB detected by voltage sensor 86. It is noted that ECU 200 may calculate SOC of main battery 42 based on temperature TB of main battery 42, in addition to current IB and voltage VB.

Though ECU 200 is described as calculating SOC of main battery 42 based on an OCV (Open Circuit Voltage) in the present embodiment, SOC calculation is not limited to such a calculation method. For example, SOC of main battery 42 may be calculated based on a charging current and a discharging current.

Though current sensor 84 is described as detecting a current on a positive electrode line in the present embodiment, detection is not particularly limited thereto. For example, a current on a negative electrode line may be detected.

ECU 200 generates control signal PWC1 for controlling boost converter 22 based on vehicle request power Ps. ECU 200 transmits generated control signal PWC1 to boost converter 22 and controls boost converter 22.

Charging device 50 charges main battery 42 with electric power from an external power supply, as a charge plug connected to the external power supply (neither of which is shown) is attached.

In vehicle 100 having the features as above, a detection error of an SOC estimation sensor used for estimation of SOC of main battery 42 varies, depending on a temperature environment of the SOC estimation sensor during use. Therefore, since SOC is estimated with a detection error being estimated large enough for SOC of main battery 42 to be not lower than a lower limit value of an available range of main battery 42, accuracy in estimation of SOC may become poor and a range of use of SOC of main battery 42 may be restricted.

Then, in the present embodiment, ECU 200 is characterized in detecting history of use of vehicle 100 for specifying a temperature of the SOC estimation sensor and then operating as follows.

Namely, ECU 200 determines a first value as a detection error of the SOC estimation sensor corresponding to a predetermined range when a specific condition for specifying that a temperature of the SOC estimation sensor is within the predetermined range is satisfied in connection with the history of use of vehicle 100. In addition, ECU 200 determines a second value greater than the first value when the specific condition is not satisfied. ECU 200 estimates SOC of main battery 42 by using any one determined detection error of the first value and the second value and a result of detection by the SOC estimation sensor.

ECU 200 updates a threshold value of a state of charge (an SOC lower limit value) of main battery 42 for operating engine 56 when vehicle 100 runs with second MG 4 while engine 56 remains stopped, based on the determined detection error.

In the present embodiment, the SOC estimation sensor is at least any one of current sensor 84, voltage sensor 86, and temperature sensor 88.

ECU 200 operates engine 56 when SOC of main battery 42 is equal to or lower than the updated threshold value while vehicle 100 runs with second MG 4 with engine 56 remaining stopped.

Under the present condition for execution, the specific condition includes such a condition that a time period during which vehicle 100 is left before system start-up is equal to or longer than a predetermined time period Ta, such a condition that vehicle 100 has continued running with MG 4 since start of running while engine 56 remains stopped, such a condition that a time period of running of the vehicle with second MG 4 while engine 56 remains stopped is equal to or shorter than a predetermined time period Tb, such a condition that a square value of a current of second MG 4 is equal to or smaller than a predetermined value A, such a condition that a temperature of main battery 42 at the time point of start of running of vehicle 100 is within a predetermined range, and such a condition that a temperature of an atmosphere around main battery 42 is within a predetermined range.

Figure 2:
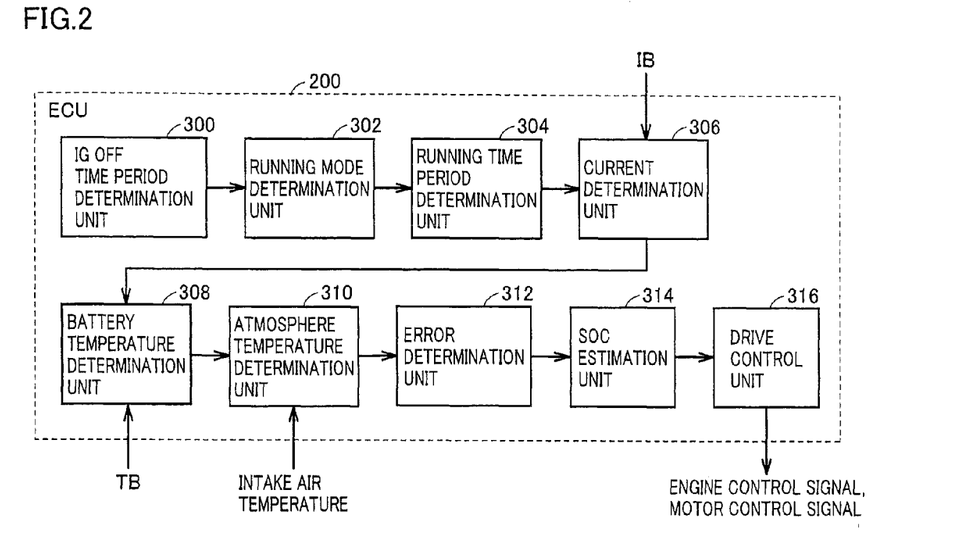
FIG. 2 is a functional block diagram of an ECU 200 which is the vehicle control device according to the present embodiment.

FIG. 2 shows a functional block diagram of ECU 200 which is the vehicle control device according to the present embodiment. ECU 200 includes an IG OFF time period determination unit 300, a running mode determination unit 302, a running time period determination unit 304, a current determination unit 306, a battery temperature determination unit 308, an atmosphere temperature determination unit 310, an error determination unit 312, an SOC estimation unit 314, and a drive control unit 316.

IG OFF time period determination unit 300 determines whether or not a time period during which vehicle 100 is left (that is, an IG OFF time period) before most recent system start-up of vehicle 100 is equal to or longer than predetermined time period Ta. Specifically, IG OFF time period determination unit 300 starts count of an elapsed time when the system of vehicle 100 is stopped by IG OFF. IG OFF time period determination unit 300 ends count of the elapsed time when the system of vehicle 100 is started up by IG ON, and updates the time period of being left by overwriting with the counted time period, the time period obtained by previous count of the time period of being left, which had been stored in a memory. IG OFF time period determination unit 300 determines whether or not the time period of being left which has been stored in the memory (that is, the time period during which vehicle 100 was left before most recent system start-up of vehicle 100) is equal to or longer than predetermined time period Ta.

Predetermined time period Ta is a time period set such that a temperature range in which the SOC estimation sensor is used can accurately be specified. Predetermined time period Ta is, for example, a time period with which a temperature of the SOC estimation sensor can be determined as substantially the same as an outside air temperature, temperature TB, or an intake air temperature, and it is adapted through experiments or the like.

It is noted that IG OFF time period determination unit 300 may set a first flag to ON, for example, when the time period during which vehicle 100 is left is determined as being equal to or longer than predetermined time period Ta.

Running mode determination unit 302 determines whether or not vehicle 100 has continued motor running using second MG 4 since start of running while engine 56 remains stopped. In the present embodiment, motor running is selected as an initial mode of vehicle 100. In addition, when SOC of main battery 42 is lower than a predetermined threshold value or when an instruction from a driver is received, a hybrid running mode in which engine 56 and the second MG are both used for running is selected. Start of running refers to a time point when the driver presses the accelerator pedal after IG ON and supply of electric power to second MG 4 is started, however, it is not particularly limited thereto.

Running mode determination unit 302 determines that vehicle 100 has continued motor running since start of running, for example, when the driver has not selected the hybrid running mode and SOC of main battery 42 has been equal to or greater than the predetermined threshold value since start of running of vehicle 100. It is noted that running mode determination unit 302 may set a second determination flag to ON, for example, when vehicle 100 is determined as having continued motor running since start of running.

Running time period determination unit 304 determines whether or not a time period during which vehicle 100 continues motor running is equal to or shorter than predetermined time period Tb. Predetermined time period Tb refers to a time period during which the temperature of the SOC estimation sensor is expected to increase to a temperature in a predetermined temperature range owing to an amount of heat which has been received and dissipated by the SOC estimation sensor during motor running since start of running of vehicle 100. Predetermined time period Tb may be adapted, for example, through experiments or the like.

For example, running time period determination unit 304 starts count of an elapsed time from a time point at which vehicle 100 starts motor running and determines whether or not a counted time period is equal to or shorter than predetermined time period Tb.

It is noted that running time period determination unit 304 may set a third determination flag to ON, for example, when a time period during which vehicle 100 continues motor running is determined as being equal to or shorter than predetermined time period Tb.

Current determination unit 306 determines whether or not a square value of a current $IB^2$ of main battery 42 detected by current sensor 84 is equal to or smaller than predetermined value A. Predetermined value A is such a value that a temperature of the SOC estimation sensor is within the predetermined temperature range even though Joule heat generated in proportion to a square value of the current is transmitted to the SOC estimation sensor, and it is adapted, for example, experimentally or in terms of design.

It is noted that current determination unit 306 may set a fourth determination flag to ON, for example, when square value of the current $IB^2$ of main battery 42 is determined as being equal to or smaller than predetermined value A.

Battery temperature determination unit 308 determines whether or not temperature TB of main battery 42 at the time point of start of running of vehicle 100 is within a predetermined range. The predetermined range may be, for example, a temperature range, a temperature in which can be determined as being substantially the same as an outside air temperature or an intake air temperature. The predetermined range may be adapted, for example, experimentally or in terms of design.

It is noted that battery temperature determination unit 308 may set a fifth determination flag to ON, for example, when temperature TB of main battery 42 at the time point of start of running of vehicle 100 is determined as being within the predetermined range.

Atmosphere temperature determination unit 310 determines whether or not a temperature of an atmosphere around main battery 42 is within a predetermined range. Atmosphere temperature determination unit 310 detects an intake air temperature detected by intake air temperature sensor 110 as a temperature of an atmosphere around main battery 42 and determines whether or not the detected intake air temperature is within the predetermined range. The predetermined range is a range set such that a temperature range in which the SOC estimation sensor is used can accurately be specified, and it is adapted, for example, through experiments or the like. It is noted that atmosphere temperature determination unit 310 may set a sixth determination flag to ON when the temperature of the atmosphere around main battery 42 is determined as being within the predetermined range.

Error determination unit 312 determines a first value e(0) as the detection error when such specific conditions that the time period during which vehicle 100 is left is equal to or longer than predetermined time period Ta, that vehicle 100 has continued motor running since start of running, that duration of motor running is equal to or shorter than predetermined time period Tb, that square value of the current $IB^2$ of main battery 42 is equal to or smaller than predetermined value A, that temperature TB of main battery 42 at the time point of start of running of vehicle 100 is within the predetermined range, and that the temperature of the atmosphere around main battery 42 is within the predetermined range are satisfied, and determines a second value e(1) greater than first value e(0) as the detection error when the specific conditions described above are not satisfied. It is noted that error determination unit 312 may determine first value e(0) as the detection error, for example, when all of the first determination flag to the sixth determination flag are ON, and may determine second value e(1) as the detection error when at least one of the first determination flag to the sixth determination flag is OFF.

Figure 3:
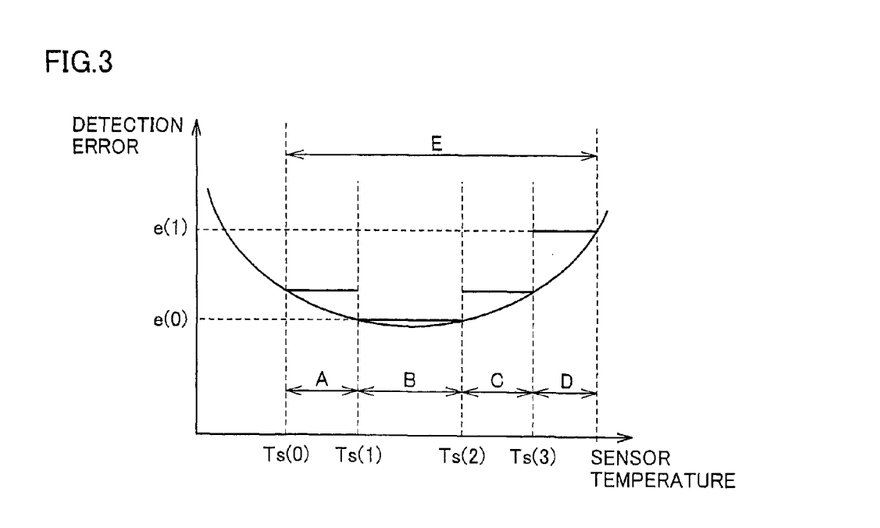
FIG. 3 is a diagram showing relation between a sensor temperature and a detection error.

As shown in FIG. 3, relation between the temperature of the SOC estimation sensor and the detection error is represented by a curve convex in a direction of a smaller detection error, with a temperature Ts(2) being defined as an extremum. Namely, as the temperature of the SOC estimation sensor is higher than temperature Ts(2), the detection error becomes greater. In addition, as the temperature of the SOC estimation sensor is lower than temperature Ts(2), the detection error becomes greater.

The specific conditions described above are conditions in connection with history of use of vehicle 100 for specifying that the temperature of the SOC estimation sensor is within a temperature range B. Therefore, when the specific conditions described above are satisfied, the temperature of the SOC estimation sensor is specified as being within temperature range B between Ts(1) and Ts(2). Therefore, error determination unit 312 determines a first value (0) as the detection error.

On the other hand, when the specific conditions described above are not satisfied, use in a temperature range different from temperature range B, i.e., a temperature range A, a temperature range C, and a temperature range D which are included in a temperature range E in which use of the SOC estimation sensor is expected, is likely. Therefore, error determination unit 312 determines a second value e(1) greater than first value e(0) as the detection error corresponding to the temperature range different from temperature range B when the specific conditions described above are not satisfied. Second value e(1) is a maximum detection error in the case of use in temperature range A, temperature range C, and temperature range D as shown in FIG. 3. Error determination unit 312 determines a detection error, for example, in each of a plurality of sensors (voltage sensor 86, current sensor 84, and temperature sensor 88).

SOC estimation unit 314 estimates SOC of main battery 42 based on a result of detection by the SOC estimation sensor. SOC estimation unit 314 estimates OCV of main battery 42, for example, based on current IB detected by current sensor 84, voltage VB detected by voltage sensor 86, and temperature TB detected by temperature sensor 88.

SOC estimation unit 314 estimates OCV of main battery 42, for example, based on an equation of OCV=VB−ΔV. It is noted that ΔV is a value in consideration of an internal resistance, polarization, and the like, and it is a value dependent on temperature TB of main battery 42. SOC estimation unit 314 estimates ΔV, for example, from temperature TB and a predetermined map.

Figure 4:
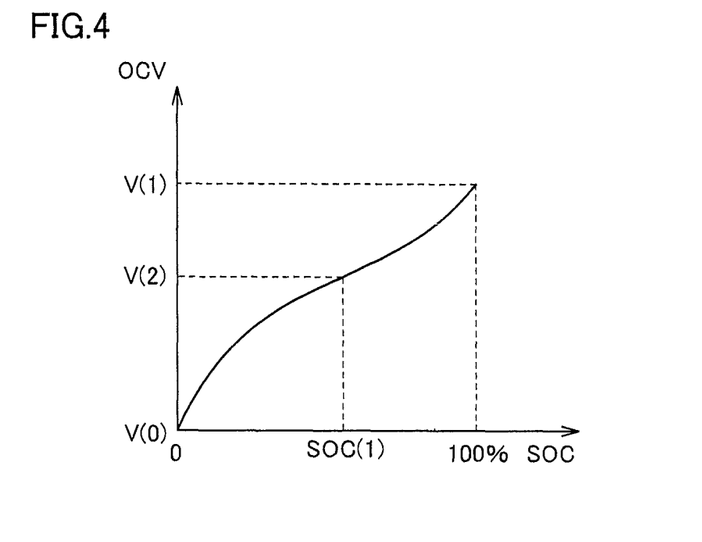
FIG. 4 is a diagram showing relation between OCV and SOC.

SOC estimation unit 314 estimates SOC of main battery 42 from estimated OCV and the map shown in FIG. 4. The map shown in FIG. 4 is a map showing relation between SOC and OCV. The ordinate in FIG. 4 represents OCV and the abscissa in FIG. 4 represents SOC. The map shown in FIG. 4 shows that SOC corresponds to 0% when OCV is at a voltage V(0) and SOC corresponds to 100% when OCV is at a voltage V(1). For example, when estimated OCV is at voltage V(2), SOC estimation unit 314 estimates that SOC of main battery 42 is at SOC (1) from the map shown in FIG. 4.

It is noted that the SOC estimation unit may estimate SOC of main battery 42 in consideration of the determined detection error, in addition to the result of detection by the SOC estimation sensor.

Drive control unit 316 controls first MG 2, second MG 4, and engine 56, based on estimated SOC. Drive control unit 316 controls first MG 2 and engine 56 such that engine 56 which has been stopped by first MG 2 starts, when estimated SOC is equal to or smaller than a threshold value for stopping motor running (that is, a threshold value for stating hybrid running) while vehicle 100 carries out motor running. Drive control unit 316 controls first MG 2, second MG 4, and engine 56 such that second MG 4 and engine 56 generate vehicle request power Ps.

In the present embodiment, drive control unit 316 updates the threshold value for stopping motor running based on the determined detection error. Specifically, drive control unit 316 calculates a lower limit value SOC(0) corresponding to first value e(0) and updates the lower limit value SOC(0) as the threshold value for stopping motor running, when first value e(0) is determined as the detection error. In addition, drive control unit 316 calculates a lower limit value SOC(1) corresponding to second value e(1) and updates the lower limit value SOC(1) as the threshold value for stopping motor running when second value e(1) is determined as the detection error.

In the present embodiment, IG OFF time period determination unit 300, running mode determination unit 302, running time period determination unit 304, current determination unit 306, battery temperature determination unit 308, atmosphere temperature determination unit 310, error determination unit 312, SOC estimation unit 314, and drive control unit 316 are all described as functioning as software implemented as the CPU of ECU 200 executes a program stored in a memory, however, they may be implemented by hardware. It is noted that such a program is mounted on a vehicle as recorded on a storage medium.

Figure 5:
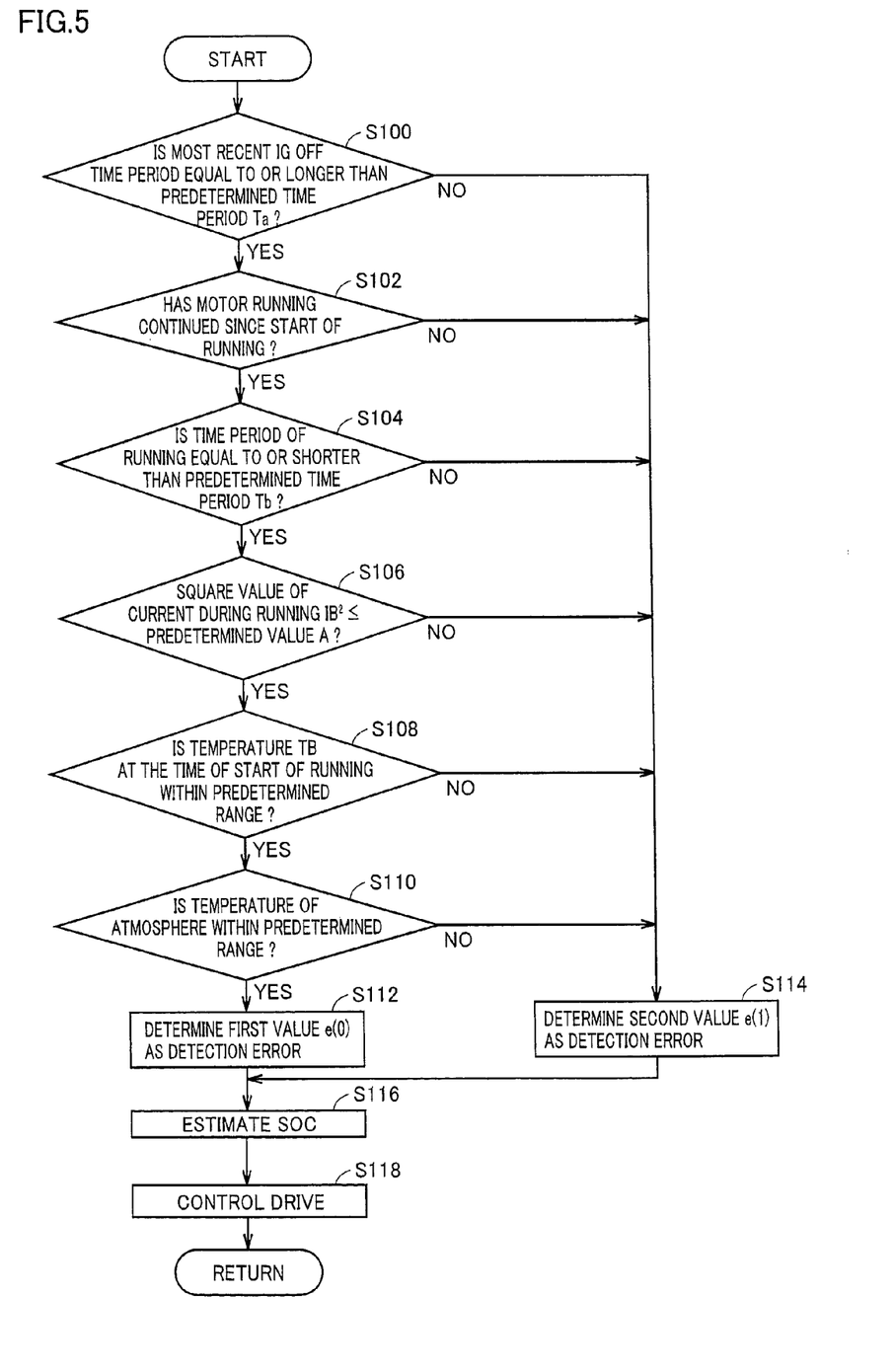
FIG. 5 is a flowchart showing a control structure of a program executed by ECU 200 which is the vehicle control device according to the present embodiment.

A control structure of a program executed by ECU 200 which is the vehicle control device according to the present embodiment will be described with reference to FIG. 5.

In a step (hereinafter a step being denoted as S) 100, ECU 200 determines whether or not an IG OFF time period of vehicle 100 (a time period of being left) before most recent system start-up of vehicle 100 is equal to or longer than predetermined time period Ta. When the IG OFF time period of vehicle 100 is equal to or longer than predetermined time period Ta (YES in S100), the process proceeds to S102. Otherwise (NO in S100), the process proceeds to S114.

In S102, ECU 200 determines whether or not vehicle 100 has continued motor running since start of running. When vehicle 100 has continued motor running since start of running (YES in S102), the process proceeds to S104. Otherwise (NO in S102), the process proceeds to S114.

In S104, ECU 200 determines whether or not a time period of running of vehicle 100 is equal to or shorter than predetermined time period Tb. When the time period of running of vehicle 100 is equal to or shorter than predetermined time period Tb (YES in S104), the process proceeds to S106. Otherwise (NO in S104), the process proceeds to S114.

In S106, ECU 200 determines whether or not square value of the current $IB^2$ of main battery 42 during running of vehicle 100 is equal to or smaller than predetermined value A. When square value of the current $IB^2$ of main battery 42 is equal to or smaller than predetermined value A (YES in S106), the process proceeds to S108. Otherwise (NO in S106), the process proceeds to S114.

In S108, ECU 200 determines whether or not temperature TB of main battery 42 at the time of start of running of vehicle 100 is within the predetermined range. When it is determined that temperature TB of main battery 42 is within the predetermined range (YES in S108), the process proceeds to S110. Otherwise (NO in S108), the process proceeds to S114.

In S110, ECU 200 determines whether or not a temperature of an atmosphere around main battery 42 is within the predetermined range. When it is determined that the temperature of the atmosphere around main battery 42 is within the predetermined range (YES in S110), the process proceeds to S112. Otherwise (NO in S110), the process proceeds to S114.

In S112, ECU 200 determines first value e(0) as the detection error. In S114, ECU 200 determines second value e(1) as the detection error. In S116, ECU 200 estimates SOC of main battery 42. It is noted that, since the method of estimating SOC of main battery 42 is as described above, detailed description thereof will not be repeated. In S118, ECU 200 controls second MG 4 and engine 56 based on estimated SOC of main battery 42 and on the threshold value updated based on the detection error.

An operation of ECU 200 which is the vehicle control device according to the present embodiment based on the structure and the flowchart as above will be described with reference to FIG. 6.

For example, a case where vehicle 100 is left for predetermined time period Ta or longer is assumed (YES in S100). When the system of vehicle 100 is started up and vehicle 100 starts running, motor running is selected as the initial running mode. When a state where the motor running mode is selected has continued (YES in S102), when the time period of running is equal to or shorter than predetermined time period Tb (YES in S104), when square value of the current $IB^2$ of main battery 42 is equal to or smaller than predetermined value A (YES in S106), when temperature TB of main battery 42 at the time of start of running is within the predetermined range (YES in S108), and when the temperature of the atmosphere around main battery 42 is within the predetermined range (YES in S110), first value e(0) is determined as the detection error.

When the time period of being left is shorter than predetermined time period Ta (NO in S100), when change to the hybrid running mode is made (NO in S102), when the time period of running exceeds predetermined time period Tb (NO in S104), when square value of the current $IB^2$ of main battery 42 exceeds predetermined value A (NO in S106), when temperature TB of main battery 42 at the time of start of running is higher or lower than the predetermined range (NO in S108), or when the temperature of the atmosphere around main battery 42 is higher or lower than the predetermined range (NO in S110), second value e(1) is determined as the detection error.

Figure 6:
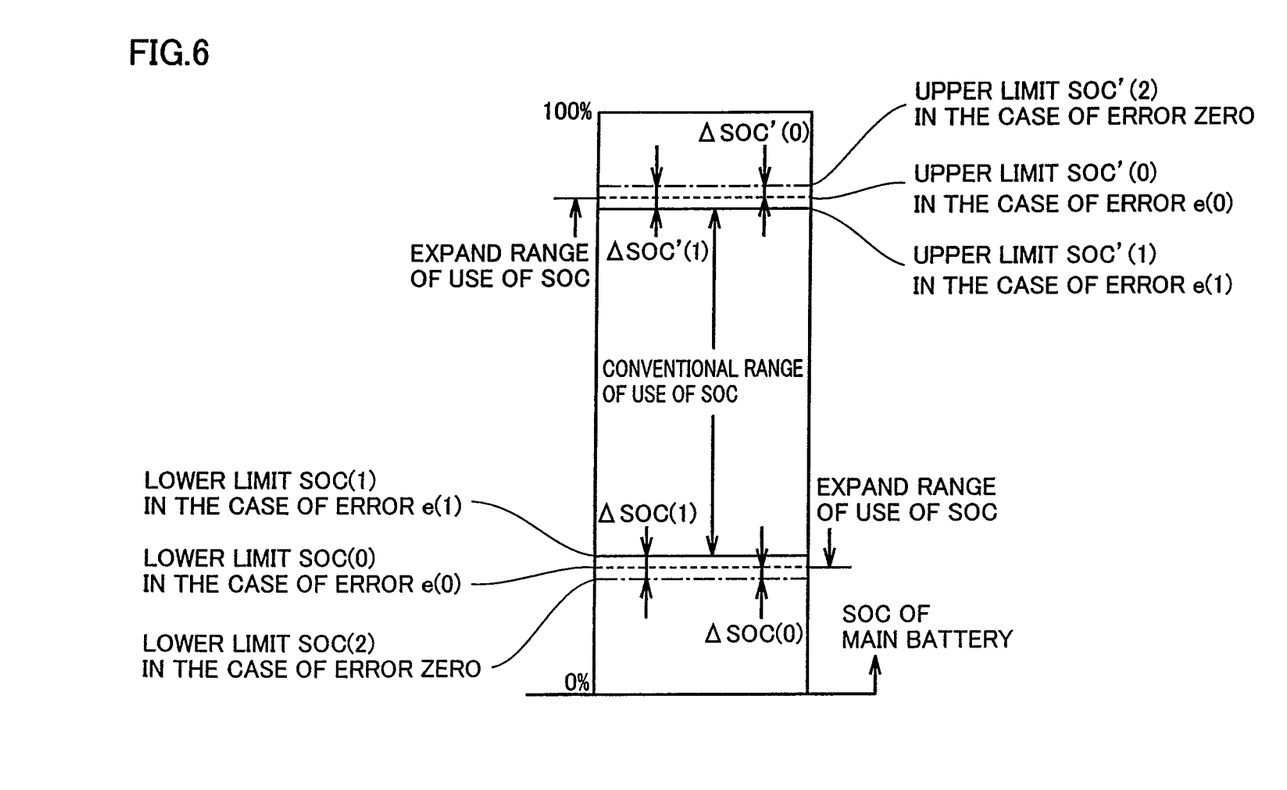
FIG. 6 is a diagram showing change in range of use of SOC.

When the specific conditions described above are satisfied, update to lower limit value SOC(0) is made as the threshold value for SOC for starting engine 56 during motor running, as shown with a dashed line in FIG. 6. Lower limit value SOC(0) is a value estimated to be greater by ASOC(0) in consideration of first value e(0) than a lower limit value SOC(2) (a chain dotted line in FIG. 6) for SOC determined by the specifications of main battery 42 when the detection error is zero. Lower limit value SOC(0) is a value set such that actual SOC of main battery 42 is reliably not lower than lower limit value SOC(2) described above even though results of detection by the SOC estimation sensor are varied in the case where the detection error is assumed as first value e(0).

When the specific conditions described above are not satisfied, as shown with a solid line in FIG. 6, update to lower limit value SOC(1) is made as the threshold value for SOC for starting engine 56 during motor running. Lower limit value SOC(1) is a value estimated to be greater by ASOC(1) in consideration of second value e(1) than lower limit value SOC(2) for SOC determined by the specifications of main battery 42 when the detection error is zero. Lower limit value SOC(1) is a value set such that actual SOC of main battery 42 is reliably not lower than lower limit value SOC(2) described above even though results of detection by the SOC estimation sensor are varied in the case where the detection error is assumed as second value e(1).

Thus, based on the determined detection error, such an SOC lower limit value that actual SOC of main battery 42 is reliably not lower than lower limit value SOC(2) described above is estimated. Since ΔSOC(0) is smaller than ΔSOC(1), a range of use of SOC is expanded by estimating the SOC lower limit value in consideration of detection error e(0).

In addition, similarly, when the specific conditions described above are satisfied, as shown with a dashed line in FIG. 6, an upper limit value SOC'(0) for SOC is a value estimated to be smaller by ΔSOC'(0) in consideration of detection error e(0) than an upper limit value SOC'(2) (a chain dotted line in FIG. 6) for SOC determined by the specifications of main battery 42 when the detection error is zero. Upper limit value SOC'(0) is a value set such that actual SOC of main battery 42 is reliably not greater than an upper limit value SOC'(2) even though results of detection by the SOC estimation sensor are varied in the case where the detection error is assumed as e(0).

When the specific conditions described above are not satisfied, as shown with a solid line in FIG. 6, an upper limit value SOC'(1) for SOC is a value estimated to be smaller by ΔSOC'(1) in consideration of detection error e(1) than upper limit value SOC'(2) for SOC determined by the specifications of main battery 42 when the detection error is zero. Upper limit value SOC'(1) is a value set such that actual SOC of main battery 42 is reliably not greater than upper limit value SOC'(2) even though results of detection by the SOC estimation sensor are varied in the case where the detection error is assumed as e(1).

Thus, based on the determined detection error, such an SOC upper limit value that actual SOC of main battery 42 is reliably not greater than upper limit value SOC'(2) described above is estimated, Since ΔSOC(0) is smaller than ΔSOC(1), a range of use of SOC' is expanded by estimating SOC in consideration of detection error e(0).

As above, according to the vehicle control device in the present embodiment, when history of use of the vehicle satisfies a specific condition for specifying that a temperature of the SOC estimation sensor is within temperature range B, first value e(0) is determined as the detection error for the SOC estimation sensor corresponding to temperature range B, and the determined detection error and the result of detection by the SOC estimation sensor are used to estimate and update the SOC lower limit value and upper limit value of the main battery. Thus, a range of use of SOC can be expanded. Thus, a time period of running with motor running of the vehicle can be expanded. Alternatively, even when there is influence by heat generated during charging in the sensor during rapid charging or the like using an external power supply, a greater amount of electric power can be stored. When the specific condition is not satisfied, second value e(1) greater than first value e(0) is determined as the detection error corresponding to temperature ranges A, C, and D different from temperature range B, so that the determined detection error and the result of detection by the SOC estimation sensor are used to estimate and update the SOC lower limit value and upper limit value of the main battery. Thus, SOC can be controlled such that SOC of the main battery reliably does not exceed the SOC lower limit value or the SOC upper limit Consequently, accelerated deterioration of the main battery can be suppressed.

Therefore, a vehicle control device and a vehicle control method achieving an expanded range of use of a state of charge of a power storage device by specifying a temperature of a sensor used for estimation of a state of charge of the power storage device can be provided.

In addition, since a temperature of the SOC estimation sensor is specified as being within a predetermined range based on history of use of the vehicle, a sensor for directly detecting a temperature of the SOC estimation sensor or a temperature around the same does not have to newly be provided. Therefore, increase in cost due to increase in the number of parts can be suppressed.

Moreover, a specific condition for determining first value e(0) as the detection error for estimating upper limit SOC and a specific condition for determining first value e(0) as the detection error for estimating the SOC lower limit value are preferably and desirably different from each other. This is because, during rapid charging of the main battery using an external power supply, influence by change in temperature of the sensor is greater than influence by history of running, depending on magnitude of a charging current, a time period of charging, or the like.

Figure 7:
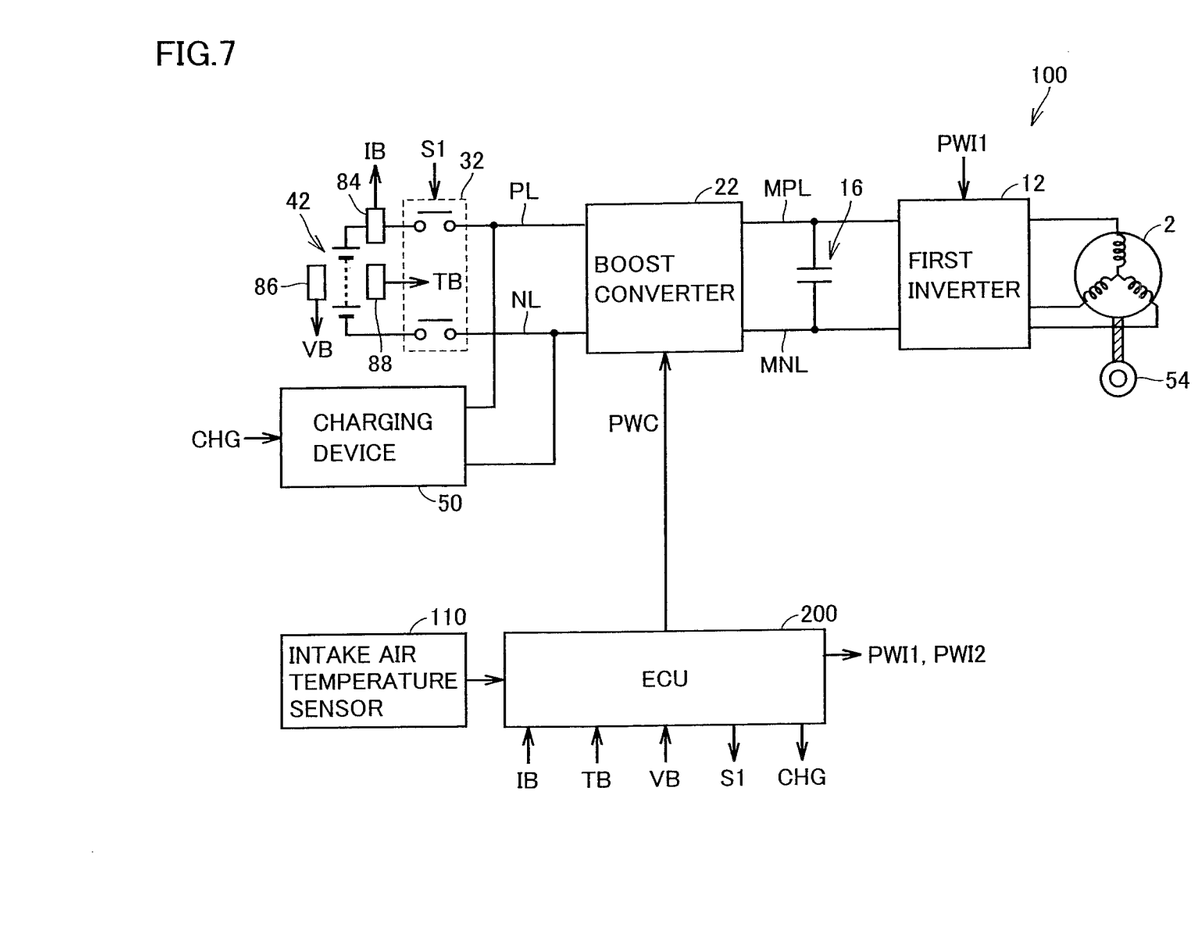
FIG. 7 is an overall block diagram of an electric car to which the present invention is applicable.

Furthermore, the configuration of vehicle 100 is not particularly limited to the configuration shown in FIG. 1, and for example, a configuration of an electric car shown in FIG. 7 may be adopted.

Vehicle 100 shown in FIG. 7 is different in configuration from vehicle 100 shown in FIG. 1 in that first MG 2 is a rotating electric machine for running for driving drive wheel 54 and that second MG 4, second inverter 14, power split device 52, and engine 56 are not provided. Since vehicle 100 in FIG. 7 is otherwise the same in configuration as vehicle 100 shown in FIG. 1, detailed description thereof will not be repeated.

In vehicle 100 shown in FIG. 7, when the specific condition described above is satisfied, first value e(0) may be determined as the detection error of the SOC estimation sensor. The same effect is achieved also by doing so. It is noted that, in vehicle 100 shown in FIG. 7, since first MG 2 is used for running from the time point of start of running, the condition that motor running has continued since start of running of vehicle 100 among the specific conditions above does not have to be included in the specific conditions.

Figure 8:
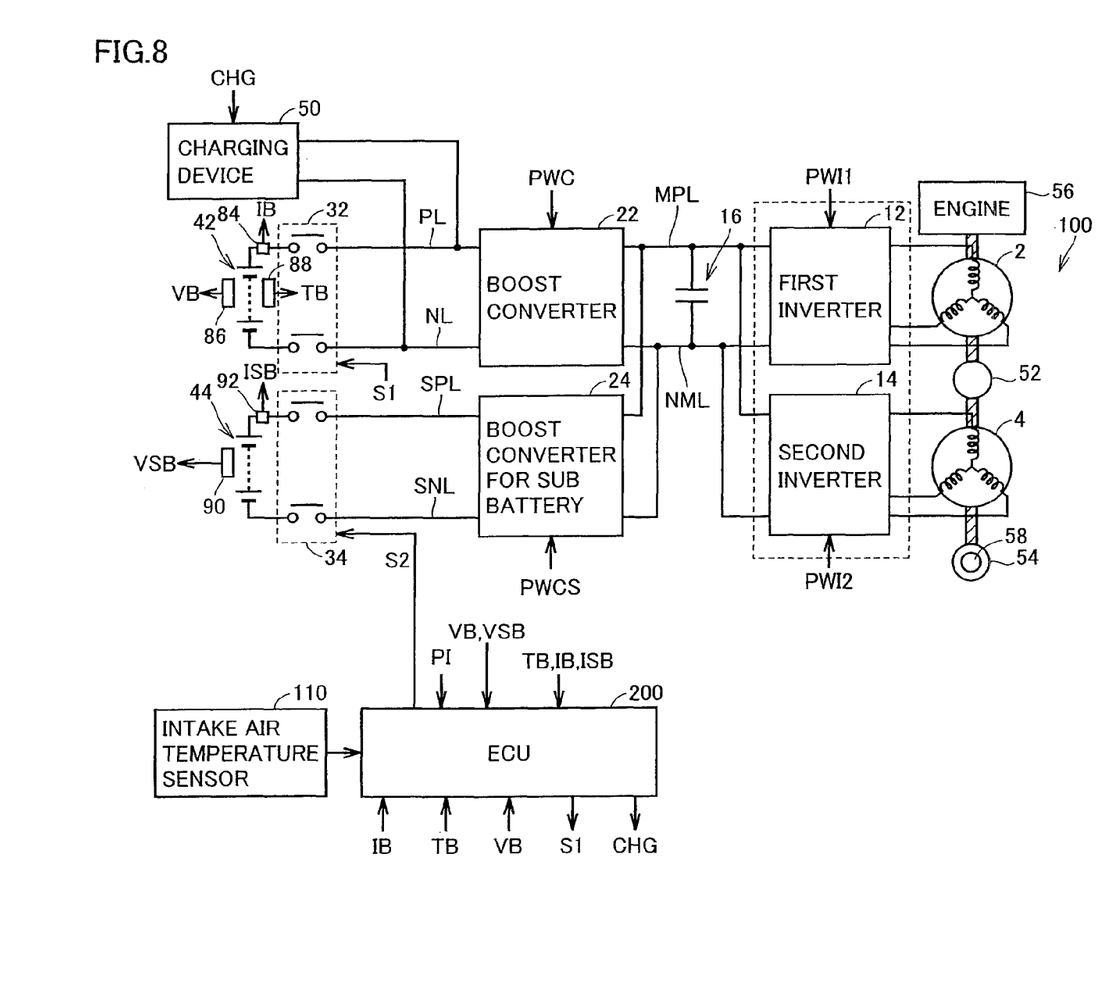
FIG. 8 is an overall block diagram of a hybrid vehicle incorporating a plurality of batteries, to which the present invention is applicable.

The configuration of vehicle 100 may be a configuration of a hybrid vehicle incorporating a plurality of batteries shown in FIG. 8. Vehicle 100 shown in FIG. 8 is different in configuration from vehicle 100 shown in FIG. 1 in including a boost converter for sub battery 24, a sub battery 44, an SMR for sub battery 34, a current sensor for sub battery 92 for detecting a current ISB of sub battery 44, and a voltage sensor for sub battery 90 for detecting a voltage VSB of sub battery 44. Since vehicle 100 shown in FIG. 8 is otherwise the same in configuration as vehicle 100 shown in FIG. 1, detailed description thereof will not be repeated.

Boost converter for sub battery 24 is connected to main positive bus MPL and main negative bus MNL in parallel to boost converter 22, and it converts a voltage between sub battery 44 and main positive bus MPL, main negative bus MNL, based on a control signal PWCS from ECU 200, ECU 200 calculates SOC of sub battery 44 based on current ISB detected by current sensor for sub battery 92 and voltage VSB detected by voltage sensor for sub battery 90. SMR for sub battery 34 switches from any one to the other of a conduction state in which sub battery 44 and boost converter for sub battery 24 are electrically connected to each other and a disconnected state in which sub battery 44 and boost converter for sub battery 24 are electrically disconnected from each other, based on a control signal S2 from ECU 200.

Figure 9:
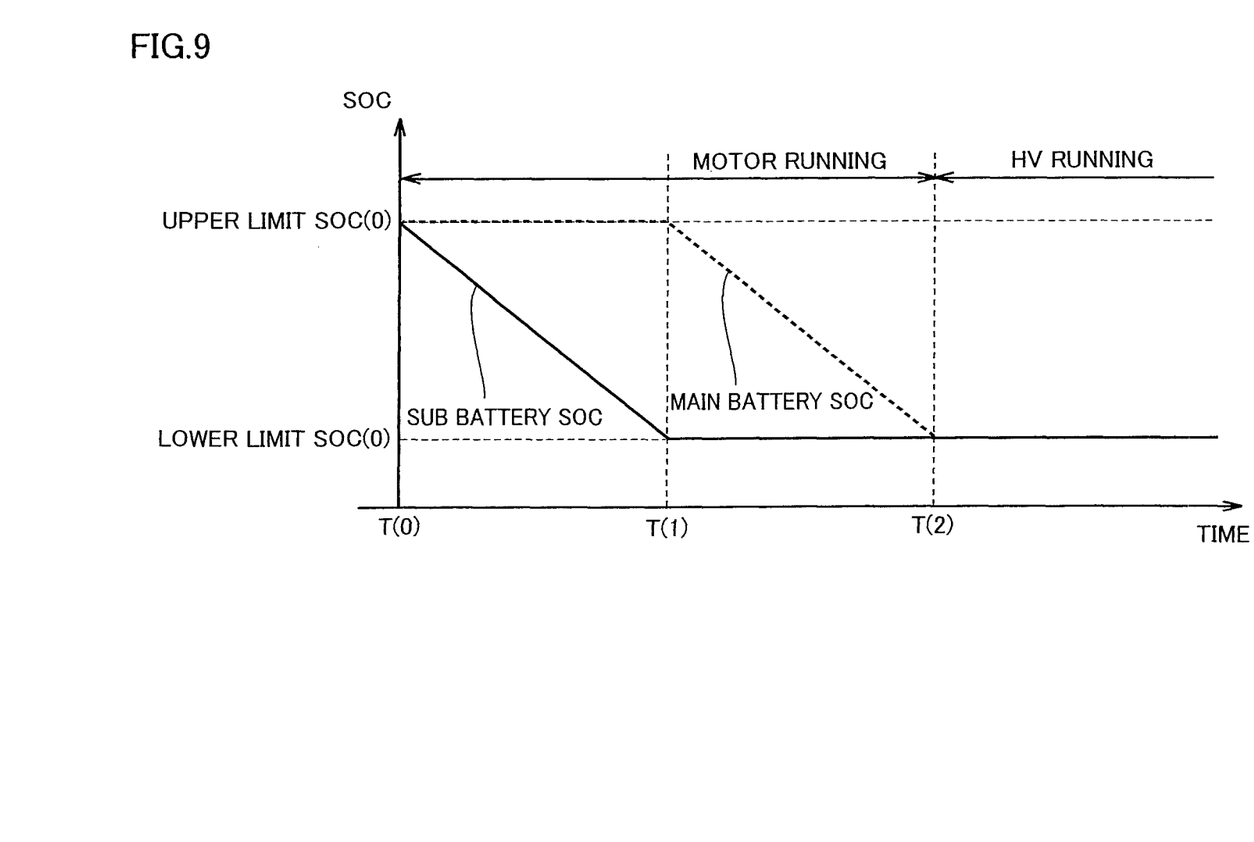
FIG. 9 is a diagram showing change in SOC in a case where the present invention is applied to a hybrid vehicle incorporating a plurality of batteries.

In such a vehicle 100, as shown in FIG. 9, at a time T(0), ECU 200 initially causes sub battery 44 as an electric power supply source to supply electric power to second MG 4 when vehicle 100 is caused to carry out motor running with the use of second MG 4 while engine 56 remains stopped. At a time T(1), ECU 200 controls SMR 32 and SMR for sub battery 34 such that an electric power supply source is switched from sub battery 44 to main battery 42 so as to supply electric power to second MG 4 when SOC of sub battery 44 has lowered to lower limit value SOC(0). At a time T(2), ECU 200 starts engine 56 so as to select hybrid running when SOC of main battery 42 has lowered to lower limit value SOC(0).

ECU 200 updates an SOC lower limit value which is a threshold value at which an electric power supply source is switched from sub battery 44 to main battery 42 based on the determined detection error, while the vehicle runs with sub battery 44 serving as the electric power supply source for the second MG.

Thus, since a range of use of SOC of main battery 42 and/or sub battery 44 can be expanded, a travel distance with motor running can be increased and in addition, a greater amount of electric power can be stored by charging.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

2, 4 MG; 12, 14 inverter; 16 smoothing capacitor; 22 boost converter; 24 boost converter for sub battery; 32 SMR; 34 SMR for sub battery; 42 main battery; 44 sub battery; 50 charging device; 52 power split device; 54 drive wheel; 56 engine; 84 current sensor; 86 voltage sensor; 88 temperature sensor; 90 voltage sensor for sub battery; 92 current sensor for sub battery; 100 vehicle; 110 intake air temperature sensor; 200 ECU; 300 OFF time period determination unit; 302 running mode determination unit; 304 running time period determination unit; 306 current determination unit; 308 battery temperature determination unit; 310 atmosphere temperature determination unit; 312 error determination unit; 314 SOC estimation unit; and 316 drive control unit.

The invention claimed is:

1. A vehicle control device mounted on a vehicle including a rotating electric machine serving as a drive source, a power storage device for supplying electric power to said rotating electric machine, and a sensor used for estimating a state of charge of said power storage device, comprising:
   a computer including a non-transitory machine-readable storage medium embodied with program instructions, the computer programmed to:
   detect a history of use of said vehicle for specifying a temperature of said sensor;
   determine a first value as a detection error of said sensor corresponding to a predetermined range when said history of use satisfies a specific condition for specifying that a temperature of said sensor is within the predetermined range;
   determine a second value greater than said first value as said detection error when said history of use does not satisfy said specific condition;
   estimate a state of charge of said power storage device by using a result of detection by said sensor and any one determined detection error of said first value and said second value;
   update an upper limit value and a lower limit value of the state of charge of said power storage device based on said first value when said first value is determined as said detection error; and
   update an upper limit value and a lower limit value of the state of charge of said power storage device based on said second value when said second value is determined as said detection error.

2. The vehicle control device according to claim 1, wherein said vehicle further includes an internal combustion engine as a drive source, and
the computer is further programmed to update a threshold value of the state of charge of said power storage device for actuating said internal combustion engine based on determined said detection error when said vehicle runs with said rotating electric machine while said internal combustion engine is stopped.

3. The vehicle control device according to claim 2, wherein said sensor includes at least any one of a voltage sensor for detecting a voltage of said power storage device, a current sensor for detecting a current of said power storage device, and a temperature sensor for detecting a temperature of said power storage device.

4. The vehicle control device according to claim 2, wherein said history of use includes a state of selection of said drive source, and
said specific condition includes such a condition that the state of selection of said drive source is a state that said vehicle has continued running with said rotating electric machine since start of running while said internal combustion engine is stopped.

5. The vehicle control device according to claim 2, wherein said history of use includes a time period of running of said vehicle, and
said specific condition includes such a condition that the time period of running of said vehicle with said rotating electric machine while said internal combustion engine is stopped is equal to or shorter than a predetermined time period.

6. The vehicle control device according to claim 1, wherein said power storage device includes a first power supply and a second power supply, and
the computer is further programmed to update a threshold value at which an electric power supply source is switched from said first power supply to said second power supply based on determined said detection error, while said vehicle runs with said first power supply serving as the electric power supply source for said rotating electric machine.

7. The vehicle control device according to claim 1, wherein said history of use includes a square value of a current of said power storage device, and
said specific condition includes such a condition that the square value of the current of said power storage device is equal to or smaller than a predetermined value.

8. The vehicle control device according to claim 1, wherein
said history of use includes a time period during which said vehicle is left before most recent system start-up of said vehicle, and
said specific condition includes such a condition that said time period of being left is equal to or longer than a predetermined time period.

9. The vehicle control device according to claim 1, wherein
said history of use includes a temperature of said power storage device, and
said specific condition includes such a condition that the temperature of said power storage device at a time point of start of running of said vehicle is within a predetermined range.

10. The vehicle control device according to claim 1, wherein
said history of use includes a temperature of an atmosphere around said power storage device, and
said specific condition includes such a condition that the temperature of the atmosphere around said power storage device is within a predetermined range.

11. The vehicle control device according to claim 1, wherein
said vehicle further includes an internal combustion engine as a drive source,
said history of use includes a state of selection of said drive source, a time period of running of said vehicle, a square value of a current of said power storage device, a time period during which said vehicle is left before most recent system start-up of said vehicle, a temperature of said power storage device, and a temperature of an atmosphere around said power storage device, and
said specific condition includes such a condition that the state of selection of said drive source is a state that said vehicle has continued running with said rotating electric machine since start of running while said internal combustion engine is stopped, such a condition that the time period of running of said vehicle with said rotating electric machine while said internal combustion engine is stopped is equal to or shorter than a predetermined time period, such a condition that the square value of the current of said power storage device is equal to or smaller than a predetermined value, such a condition that said time period of being left is equal to or longer than a predetermined time period, such a condition that the temperature of said power storage device at a time point of start of running of said vehicle is within a predetermined range, and such a condition that the temperature of the atmosphere around said power storage device is within a predetermined range.

12. A vehicle control method for a vehicle including a rotating electric machine serving as a drive source, a power storage device for supplying electric power to said rotating electric machine, a sensor used for estimating a state of charge of said power storage device, and an electronic control unit including a non-transitory machine-readable storage medium embodied with program instructions for causing a computer to execute a method comprising the steps of:
detecting history of use of said vehicle for specifying a temperature of said sensor;
determining a first value as a detection error of said sensor corresponding to a predetermined range when said history of use satisfies a specific condition for specifying that a temperature of said sensor is within the predetermined range;
determining a second value greater than said first value as said detection error when said history of use does not satisfy said specific condition;
estimating a state of charge of said power storage device by using a result of detection by said sensor and any one determined detection error of said first value and said second value;
updating an upper limit value and a lower limit value of the state of charge of said power storage device based on said first value when said first value is determined as said detection error; and
updating an upper limit value and a lower limit value of the state of charge of said power storage device based on said second value when said second value is determined as said detection error.

* * * * *